(12) United States Patent
Yunbai

(10) Patent No.: US 12,124,012 B2
(45) Date of Patent: *Oct. 22, 2024

(54) IMAGING LENS

(71) Applicant: TOKYO VISIONARY OPTICS CO., LTD., Tokyo (JP)

(72) Inventor: Huang Yunbai, Tokyo (JP)

(73) Assignee: TOKYO VISIONARY OPTICS Co., Ltd., Toyko (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,857

(22) Filed: Aug. 2, 2021

(65) Prior Publication Data
US 2021/0356718 A1    Nov. 18, 2021

Related U.S. Application Data

(63) Continuation of application No. 16/895,709, filed on Jun. 8, 2020, now Pat. No. 11,867,878.

(30) Foreign Application Priority Data

Aug. 19, 2019  (JP) .................................. 2019-149695

(51) Int. Cl.
*G02B 13/00*  (2006.01)
*G02B 9/64*  (2006.01)

(52) U.S. Cl.
CPC ........... *G02B 13/0045* (2013.01); *G02B 9/64* (2013.01)

(58) Field of Classification Search
CPC .......................... G02B 13/001; G02B 13/0015; G02B 13/002; G02B 13/0045; G02B 13/18; G02B 9/00; G02B 9/64; G02B 9/62; G02B 1/041; G02B 27/0025

USPC ................................. 359/708, 713, 755, 754
See application file for complete search history.

(56) References Cited

U.S. PATENT DOCUMENTS

| | | | |
|---|---|---|---|
| 10,209,491 B1* | 2/2019 | Fang .................. | G02B 27/0025 |
| 2014/0376105 A1* | 12/2014 | Sekine ............... | G02B 13/0045 |
| | | | 359/708 |
| 2015/0070783 A1* | 3/2015 | Hashimoto ............ | G06T 5/002 |
| | | | 359/708 |
| 2015/0198791 A1* | 7/2015 | Kubota .............. | G02B 27/0025 |
| | | | 359/689 |
| 2019/0121088 A1* | 4/2019 | Shi .......................... | G02B 9/64 |

FOREIGN PATENT DOCUMENTS

CN            109445073           3/2019

* cited by examiner

*Primary Examiner* — Marin Pichler
(74) *Attorney, Agent, or Firm* — Maine Cernota & Curran

(57) ABSTRACT

There is provided an imaging lens with excellent optical characteristics which satisfies demand of a low profile and a low F-number. An imaging lens comprises in order from an object side to an image side, a first lens with positive refractive power having a convex object-side surface in a paraxial region, a second lens with negative refractive power in a paraxial region, a third lens with positive refractive power in a paraxial region, a fourth lens, a fifth lens with negative refractive power in a paraxial region, a sixth lens with positive refractive power having a convex object-side surface in a paraxial region, and a seventh lens with negative refractive power having a concave image-side surface in a paraxial region, and predetermined conditional expressions are satisfied.

9 Claims, 7 Drawing Sheets

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN109445073A) discloses an imaging lens comprising, in order from an object side, a first lens with positive refractive power, a second lens with negative refractive power, a third lens, a fourth lens, a fifth lens, a sixth lens having a concave object-side surface, and a seventh lens with negative refractive power, and a relationship among a focal length of the overall optical system, a focal length of the fourth lens and a focal length of the fifth lens satisfies a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface (surface being convex)", "a concave surface (surface being concave)" or "a flat surface (surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power having a convex object-side surface in a paraxial region, a second lens with negative refractive power in a paraxial region, a third lens with positive refractive power in a paraxial region, a fourth lens, a fifth lens with negative refractive power in a paraxial region, a sixth lens with positive refractive power having a convex object-side surface in a paraxial region, and a seventh lens with negative refractive power having a concave image-side surface in a paraxial region.

According to the imaging lens having an above-described configuration, the first lens achieves reduction in a profile of the imaging lens by strengthening the refractive power. Furthermore, when the first lens has the object-side surface being convex in the paraxial region, spherical aberration and distortion are properly suppressed.

The second lens properly corrects the spherical aberration, chromatic aberration, coma aberration, astigmatism and the distortion.

The third lens achieves reduction in the profile, and properly corrects the astigmatism, field curvature and the distortion.

The fourth lens properly corrects the astigmatism, the field curvature and the distortion.

The fifth lens properly corrects the chromatic aberration, the astigmatism and the distortion.

The sixth lens achieves reduction in the profile, and properly corrects the astigmatism, the field curvature and the distortion.

The seventh lens properly corrects the chromatic aberration, the astigmatism, the field curvature and the distortion. When the image-side surface of the seventh lens is concave in the paraxial region, a back focus can be secured while maintaining a low profile.

According to the imaging lens having the above-described configuration, it is preferable that the third lens has an image-side surface being concave in the paraxial region.

When the third lens has the image-side surface being concave in the paraxial region, the astigmatism and the distortion can be properly corrected.

According to the imaging lens having the above-described configuration, it is preferable that the fifth lens has an object-side surface being concave in the paraxial region.

When the fifth lens has the object-side surface being concave in the paraxial region, the astigmatism and the distortion can be properly corrected.

According to the imaging lens having the above-described configuration, it is preferable that the sixth lens has an image-side surface being concave in the paraxial region.

When the sixth lens has the image-side surface being concave in the paraxial region, the astigmatism, the field curvature and the distortion can be properly corrected.

According to the imaging lens having the above-described configuration, it is preferable that the image-side surface of the sixth lens is formed as an aspheric surface having at least one pole point in a position off the optical axis.

When the image-side surface of the sixth lens is formed as the aspheric surface having at least one pole point in the position off the optical axis, the field curvature and the distortion can be more properly corrected, and a light ray incident angle to an image sensor can be appropriately controlled.

According to the imaging lens having the above-described configuration, it is preferable that an object-side surface of the seventh lens is formed as an aspheric surface having at least one pole point in a position off the optical axis.

When the object-side surface of the seventh lens is formed as the aspheric surface having at least one pole point in the position off the optical axis, the field curvature and the distortion can be more properly corrected, and a light ray incident angle to the image sensor can be appropriately controlled.

According to the imaging lens having the above-described configuration, it is preferable that the image-side surface of the seventh lens is formed as an aspheric surface having at least one pole point in a position off the optical axis.

When the image-side surface of the seventh lens is formed as the aspheric surface having at least one pole point in the position off the optical axis, the field curvature and the distortion can be more properly corrected, and a light ray incident angle to the image sensor can be appropriately controlled.

According to the imaging lens having the above-described configuration, it is preferable that the following conditional expression (1) is satisfied:

$$40.00 < vd5 < 72.00 \tag{1}$$

where vd5: an abbe number at d-ray of the fifth lens.

The conditional expression (1) defines an appropriate range of the abbe number at d-ray of the fifth lens. By satisfying the conditional expression (1), the chromatic aberration can be properly corrected.

According to the imaging lens having the above-described configuration, it is preferable that the following conditional expression (2) is satisfied:

$$3.30 < |r10|/f \tag{2}$$

where r10: a paraxial curvature radius of an image-side surface of the fifth lens, and f: a focal length of the overall optical system of the imaging lens.

The conditional expression (2) defines an appropriate range of the paraxial curvature radius of the image-side surface of the fifth lens. By satisfying the conditional expression (2), the astigmatism and the distortion can be properly corrected.

According to the imaging lens having the above-described configuration, it is preferable that the following conditional expression (3) is satisfied:

$$9.00 < vd3 < 39.00 \tag{3}$$

where vd3: an abbe number at d-ray of the third lens.

The conditional expression (3) defines an appropriate range of the abbe number at d-ray of the third lens. By satisfying the conditional expression (3), the chromatic aberration can be properly corrected.

According to the imaging lens having the above-described configuration, it is preferable that the following conditional expression (4) is satisfied:

$$1.50 < T6/T5 < 8.00 \tag{4}$$

where

T6: a distance along the optical axis from an image-side surface of the sixth lens to an object-side surface of the seventh lens, and T5: a distance along the optical axis from an image-side surface of the fifth lens to an object-side surface of the sixth lens.

The conditional expression (4) defines an appropriate range of a relationship between the distance along the optical axis from the image-side surface of the sixth lens to the object-side surface of the seventh lens, and the distance along the optical axis from the image-side surface of the fifth lens to the object-side surface of the sixth lens. By satisfying the conditional expression (4), the sixth lens is arranged at an optimum position, and aberration correction function of the lens becomes more effective. As a result, reduction in the profile can be achieved, and the astigmatism, the field curvature and the distortion can be properly corrected.

According to the imaging lens having the above-described configuration, it is preferable that the following conditional expression (5) is satisfied:

$$-8.50 < f5/f < -1.50 \tag{5}$$

where f5: a focal length of the fifth lens, and f: a focal length of the overall optical system of the imaging lens.

The conditional expression (5) defines an appropriate range of the focal length of the fifth lens. By satisfying the conditional expression (5), the chromatic aberration, the astigmatism and the distortion can be properly corrected.

According to the imaging lens having the above-described configuration, it is preferable that the following conditional expression (6) is satisfied:

$$1.45 < f2/f7 < 4.50 \tag{6}$$

where f2: a focal length of the second lens, and f7: a focal length of the seventh lens.

The conditional expression (6) defines an appropriate range of a relationship between the focal length of the second lens and the focal length of the seventh lens. By satisfying the conditional expression (6), refractive powers of the second lens and the seventh lens can be appropriately balanced. As a result, the chromatic aberration, coma aberration, the astigmatism, the field curvature and the distortion can be properly corrected.

According to the imaging lens having the above-described configuration, it is preferable that the following conditional expression (7) is satisfied:

$$6.00 < r4/T2 < 14.00 \tag{7}$$

where r4: a paraxial curvature radius of an image-side surface of the second lens, and T2: a distance along the optical axis from an image-side surface of the second lens to an object-side surface of the third lens.

The conditional expression (7) defines an appropriate range of a relationship between the paraxial curvature radius of the image-side surface of the second lens and the distance along the optical axis from the image-side surface of the second lens to the object-side surface of the third lens. By satisfying the conditional expression (7), refractive powers of the image-side surface of the second lens can be maintained, a light ray incident angle to the object-side surface of the third lens can be appropriately controlled, and the astigmatism and the distortion can be properly corrected.

According to the imaging lens having the above-described configuration, it is preferable that the following conditional expression (8) is satisfied:

$$1.00 < r6/f < 12.00 \tag{8}$$

where r6: a paraxial curvature radius of an image-side surface of the third lens, and f: a focal length of the overall optical system of the imaging lens.

The conditional expression (8) defines an appropriate range of the paraxial curvature radius of the image-side surface of the third lens. By satisfying the conditional expression (8), the astigmatism and the distortion can be properly corrected.

According to the imaging lens having the above-described configuration, it is preferable that the following conditional expression (9) is satisfied:

$$0.30 < r12/f < 3.50 \qquad (9)$$

where r12: a paraxial curvature radius of an image-side surface of the sixth lens, and f: a focal length of the overall optical system of the imaging lens.

The conditional expression (9) defines an appropriate range of the paraxial curvature radius of the image-side surface of the sixth lens. By satisfying the conditional expression (9), the astigmatism, the field curvature and the distortion can be properly corrected.

According to the imaging lens having the above-described configuration, it is preferable that the following conditional expression (10) is satisfied:

$$0.75 < D3/T3 < 1.90 \qquad (10)$$

where

D3: a thickness along the optical axis of the third lens, and

T3: a distance along the optical axis from an image-side surface of the third lens to an object-side surface of the fourth lens.

The conditional expression (10) defines an appropriate range of a relationship between the thickness along the optical axis of the third lens and the distance along the optical axis from the image-side surface of the third lens to the object-side surface of the fourth lens. By satisfying the conditional expression (10), reduction in the profile can be achieved, and the astigmatism and the distortion can be properly corrected.

According to the imaging lens having the above-described configuration, it is preferable that the following conditional expression (11) is satisfied:

$$3.50 < (T3/TTL) \times 100 < 8.00 \qquad (11)$$

where

T3: a distance along the optical axis from an image-side surface of the third lens to an object-side surface of the fourth lens, and TTL: a total track length.

The conditional expression (11) defines an appropriate range of the distance along the optical axis from the image-side surface of the third lens to the object-side surface of the fourth lens. By satisfying the conditional expression (11), reduction in the profile can be achieved, a light ray incident angle to the object-side surface of the fourth lens can be appropriately controlled, and the astigmatism and the distortion can be properly corrected.

According to the imaging lens having the above-described configuration, it is preferable that the following conditional expression (12) is satisfied:

$$0.70 < T3/D4 < 2.00 \qquad (12)$$

where

T3: a distance along the optical axis from an image-side surface of the third lens to an object-side surface of the fourth lens, and D4: a thickness along the optical axis of the fourth lens.

The conditional expression (12) defines an appropriate range of a relationship between the distance along the optical axis from the image-side surface of the third lens to the object-side surface of the fourth lens and the thickness along the optical axis of the fourth lens. By satisfying the conditional expression (12), reduction in the profile can be achieved, and the astigmatism and the distortion can be properly corrected.

According to the imaging lens having the above-described configuration, it is preferable that the following conditional expression (13) is satisfied:

$$0.25 < D4/D7 < 0.75 \qquad (13)$$

where

D4: a thickness along the optical axis of the fourth lens, and

D7: a thickness along the optical axis of the seventh lens.

The conditional expression (13) defines an appropriate range of a relationship between the thickness along the optical axis of the fourth lens and the thickness along the optical axis of the seventh lens. By satisfying the conditional expression (13), reduction in the profile can be achieved, and the astigmatism and the distortion can be properly corrected.

According to the imaging lens having the above-described configuration, it is preferable that the following conditional expression (14) is satisfied:

$$-1.40 < f1/f7 < -0.30 \qquad (14)$$

where f1: a focal length of the first lens, and f7: a focal length of the seventh lens.

The conditional expression (14) defines an appropriate range of a relationship between the focal length of the first lens and the focal length of the seventh lens. By satisfying the conditional expression (14), refractive powers of the first lens and the seventh lens can be appropriately balanced. As a result, reduction in the profile can be achieved, and the chromatic aberration, the astigmatism, the field curvature and the distortion can be properly corrected.

According to the imaging lens having the above-described configuration, it is preferable that the following conditional expression (15) is satisfied:

$$2.50 < r2/D1 < 12.00 \qquad (15)$$

where r2: a paraxial curvature radius of an image-side surface of the first lens, and D1: a thickness along the optical axis of the first lens.

The conditional expression (15) defines an appropriate range of a relationship between the paraxial curvature radius of the image-side surface of the first lens and the thickness along the optical axis of the first lens. By satisfying the conditional expression (15), reduction in the profile can be achieved, and the astigmatism and the distortion can be properly corrected.

According to the imaging lens having the above-described configuration, it is preferable that the following conditional expression (16) is satisfied:

$$0.40 < r2/r3 < 2.00 \qquad (16)$$

where r2: a paraxial curvature radius of an image-side surface of the first lens, and r3: a paraxial curvature radius of an object-side surface of the second lens.

The conditional expression (16) defines an appropriate range of a relationship between the paraxial curvature radius of the image-side surface of the first lens and the paraxial curvature radius of the object-side surface of the second lens. By satisfying the conditional expression (16), the astigmatism, the field curvature and the distortion can be properly corrected.

According to the imaging lens having the above-described configuration, it is preferable that the following conditional expression (17) is satisfied:

$$0.85 < r5/f < 6.00 \qquad (17)$$

where
r5: a paraxial curvature radius of an object-side surface of the third lens, and
f: a focal length of the overall optical system of the imaging lens.

The conditional expression (17) defines an appropriate range of the paraxial curvature radius of the object-side surface of the third lens. By satisfying the conditional expression (17), the astigmatism, the field curvature and the distortion can be properly corrected.

According to the imaging lens having the above-described configuration, it is preferable that the following conditional expression (18) is satisfied:

$$-4.50 < r9/f < -1.45 \qquad (18)$$

where
r9: a paraxial curvature radius of an object-side surface of the fifth lens, and
f: a focal length of the overall optical system of the imaging lens.

The conditional expression (18) defines an appropriate range of the paraxial curvature radius of the object-side surface of the fifth lens. By satisfying the conditional expression (18), the astigmatism and the distortion can be properly corrected.

According to the imaging lens having the above-described configuration, it is preferable that the following conditional expression (19) is satisfied:

$$0.10 < r11/f < 0.70 \qquad (19)$$

where
r11: a paraxial curvature radius of an object-side surface of the sixth lens, and
f: a focal length of the overall optical system of the imaging lens.

The conditional expression (19) defines an appropriate range of the paraxial curvature radius of the object-side surface of the sixth lens. By satisfying the conditional expression (19), the astigmatism, the field curvature and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Figure 1:
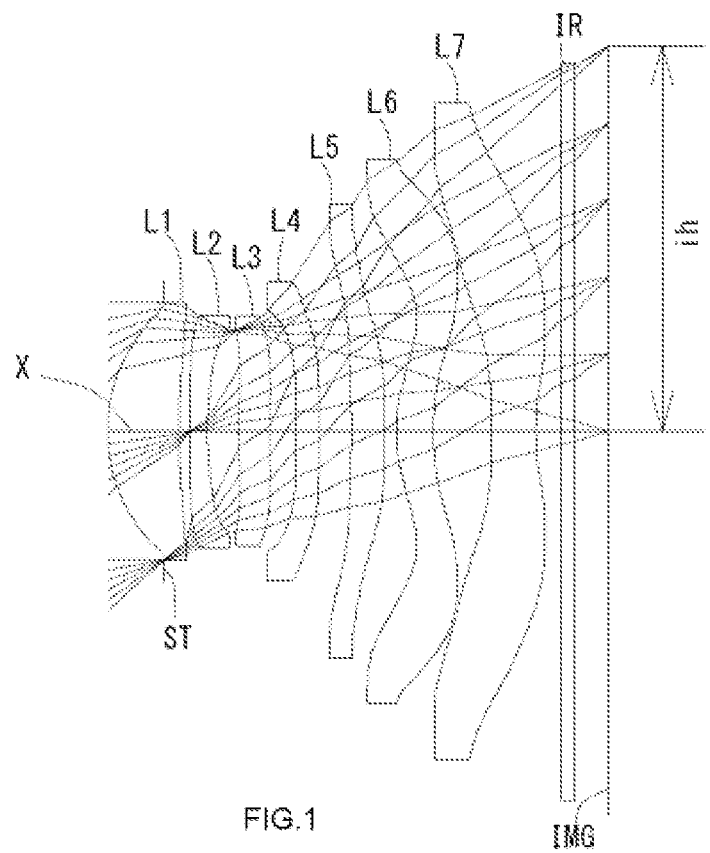
FIG. 1 is a schematic view showing an imaging lens in Example 1 according to the present invention.

Hereinafter, the preferred embodiment of the present invention will be described in detail referring to the accompanying drawings.

FIGS. 1, 3, 5, 7, 9, 11 and 13 are schematic views of the imaging lenses in Examples 1 to 7 according to the embodiments of the present invention, respectively.

The imaging lens according to the present invention comprises, in order from an object side to an image side, a first lens L1 with positive refractive power having an object-side surface being convex in a paraxial region, a second lens L2 with negative refractive power in a paraxial region, a third lens L3 with positive refractive power in a paraxial region, a fourth lens L4, a fifth lens L5 with negative refractive power in a paraxial region, a sixth lens L6 with positive refractive power having an object-side surface being convex in a paraxial region, and a seventh lens L7 with negative refractive power having an image-side surface being concave in a paraxial region.

A filter IR such as an IR cut filter or a cover glass is arranged between the seventh lens L7 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

The first lens L1 has the positive refractive power and is formed in a meniscus shape having the object-side surface being convex and an image-side surface being concave in a paraxial region (near the optical axis X). Therefore, reduction in a profile is achieved, and spherical aberration, astigmatism and distortion are suppressed by strengthening the refractive power.

The second lens L2 has the negative refractive power and is formed in a meniscus shape having an object-side surface being convex and an image-side surface being concave in a paraxial region (near the optical axis X). Therefore, the spherical aberration, chromatic aberration, coma aberration, the astigmatism and the distortion are properly corrected.

The third lens L3 has the positive refractive power and is formed in a meniscus shape having an object-side surface being convex and an image-side surface being concave in a paraxial region (near the optical axis X). Therefore, reduction in a profile is achieved, and the astigmatism, field curvature and the distortion are properly corrected.

The fourth lens L4 substantially has no refractive power, and is formed in a shape having an object-side surface and an image-side surface which are flat in a paraxial region (near the optical axis X). Therefore, the astigmatism, the field curvature and the distortion are properly corrected by aspheric surfaces on both sides without affecting a focal length of the overall optical system of the imaging lens.

Regarding the shape of the fourth lens L4, the object-side surface and the image-side surface of the fourth lens are not limited to flat surfaces in the paraxial region. When effects on the focal length of the overall optical system and refractive powers of the lenses become small, the fourth lens L4 may be made in a meniscus shape having a convex object-side surface, a biconvex shape having the convex object-side surface and a convex image-side surface, a meniscus shape having a concave object-side surface, or a biconcave shape having the concave object-side surface and a concave image-side surface. Furthermore, the fourth lens L4 may be made in a shape having the flat object-side surface and the convex or concave image-side surface, a shape having the flat image-side surface and the convex or concave object-side surface, or the like.

The fifth lens L5 has the negative refractive power and is formed in a meniscus shape having an object-side surface being concave and an image-side surface being convex in a paraxial region. Therefore, the chromatic aberration, the astigmatism and the distortion are properly corrected.

Figure 7:
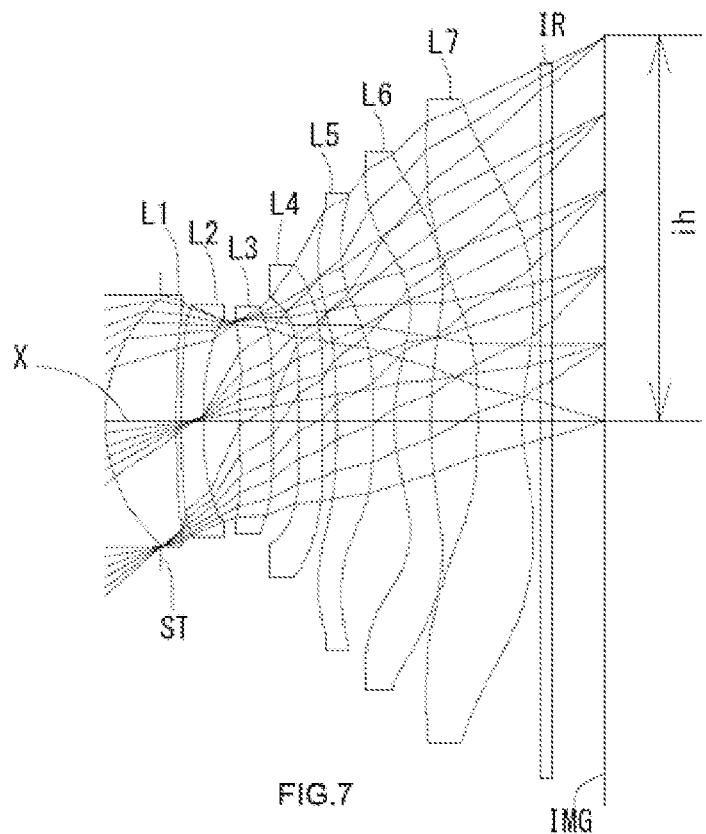
FIG. 7 is a schematic view showing an imaging lens in Example 4 according to the present invention.

The fifth lens L5 may be formed in a biconcave shape having the object-side surface and the image-side surface being concave in the paraxial region (near the optical axis X) as in Example 4 shown in FIG. 7. In this case, the chromatic aberration can be more properly corrected by the negative refractive power on both surfaces.

The sixth lens L6 has the positive refractive power and is formed in a meniscus shape having the object-side surface being convex and an image-side surface being concave in a paraxial region (near the optical axis X). Therefore, reduction in the profile is achieved, and the astigmatism, the field curvature and the distortion are properly corrected.

The seventh lens L7 has the negative refractive power and is formed in a meniscus shape having an object-side surface being convex and the image-side surface being concave in a paraxial region. Therefore, the chromatic aberration, the astigmatism, the field curvature and the distortion are properly corrected. Furthermore, providing the image-side surface being concave in the paraxial region, a back focus is secured while maintaining the low profile.

Regarding the imaging lens according to the present embodiments, it is preferable that all lenses of the first lens L1 to the seventh lens L7 are single lenses. Configuration only with the single lenses can frequently use the aspheric surfaces. In the present embodiments, all lens surfaces are formed as appropriate aspheric surfaces, and the aberrations are properly corrected. Furthermore, in comparison with the case in which a cemented lens is used, workload is reduced, and manufacturing in low cost becomes possible.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (19).

$$40.00 < vd5 < 72.00 \tag{1}$$

$$3.30 < |r10|/f \tag{2}$$

$$9.00 < vd3 < 39.00 \tag{3}$$

$$1.50 < T6/T5 < 8.00 \tag{4}$$

$$-8.50 < f5/f < -1.50 \tag{5}$$

$$1.45 < f2/f7 < 4.50 \tag{6}$$

$$6.00 < r4/T2 < 14.00 \tag{7}$$

$$1.00 < r6/f < 12.00 \tag{8}$$

$$0.30 < r12/f < 3.50 \tag{9}$$

$$0.75 < D3/T3 < 1.90 \tag{10}$$

$$3.50 < (T3/TTL) \times 100 < 8.00 \tag{11}$$

$$0.70 < T3/D4 < 2.00 \tag{12}$$

$$0.25 < D4/D7 < 0.75 \tag{13}$$

$$-1.40 < f1/f7 < -0.30 \tag{14}$$

$$2.50 < r2/D1 < 12.00 \tag{15}$$

$$0.40 < r2/r3 < 2.00 \tag{16}$$

$$0.85 < r5/f < 6.00 \tag{17}$$

$$-4.50 < r9/f < -1.45 \tag{18}$$

$$0.10 < r11/f < 0.70 \tag{19}$$

where vd3: an abbe number at d-ray of the third lens L3, vd5: an abbe number at d-ray of the fifth lens L5, D1: a thickness along the optical axis X of the first lens L1, D3: a thickness along the optical axis X of the third lens L3, D4: a thickness along the optical axis X of the fourth lens L4, D7: a thickness along the optical axis X of the seventh lens L7, T2: a distance along the optical axis X from an image-side surface of the second lens L2 to an object-side surface of the third lens L3, T3: a distance along the optical axis X from an image-side surface of the third lens L3 to an object-side surface of the fourth lens L4, T5: a distance along the optical axis X from an image-side surface of the fifth lens L5 to an object-side surface of the sixth lens L6, T6: a distance along the optical axis X from an image-side surface of the sixth lens L6 to an object-side surface of the seventh lens L7, TTL: a total track length,
f: a focal length of the overall optical system of the imaging lens,
f1: a focal length of the first lens L1,
f2: a focal length of the second lens L2,
f5: a focal length of the fifth lens L5,
f7: a focal length of the seventh lens L7,
r2: a paraxial curvature radius of an image-side surface of the first lens L1,
r3: a paraxial curvature radius of an object-side surface of the second lens L2,
r4: a paraxial curvature radius of an image-side surface of the second lens L2,
r5: a paraxial curvature radius of an object-side surface of the third lens L3,
r6: a paraxial curvature radius of an image-side surface of the third lens L3,
r9: a paraxial curvature radius of an object-side surface of the fifth lens L5,
r10: a paraxial curvature radius of an image-side surface of the fifth lens L5,
r11: a paraxial curvature radius of an object-side surface of the sixth lens L6, and
r12: a paraxial curvature radius of an image-side surface of the sixth lens L6.

It is not necessary to satisfy the above all conditional expressions, and by satisfying the conditional expression individually, operational advantage corresponding to each conditional expression can be obtained.

The imaging lens according to the present embodiments shows further preferable effect by satisfying the following conditional expressions (1a) to (19a):

$$47.50 < vd5 < 64.00 \tag{1a}$$

$$4.50 < |r10|/f < 40.00 \tag{2a}$$

$$17.00 < vd3 < 32.00 \tag{3a}$$

$$1.85 < T6/T5 < 6.50 \tag{4a}$$

$$-7.00 < f5/f < -2.50 \tag{5a}$$

$$1.80 < f2/f7 < 4.00 \tag{6a}$$

$$7.00 < r4/T2 < 12.50 \tag{7a}$$

$$1.60 < r6/f < 10.00 \tag{8a}$$

$$0.50 < r12/f < 2.90 \tag{9a}$$

$$0.85 < D3/T3 < 1.60 \tag{10a}$$

$$4.25 < (T3/TTL) \times 100 < 7.00 \tag{11a}$$

$$0.85 < T3/D4 < 1.65 \tag{12a}$$

$$0.40 < D4/D7 < 0.65 \tag{13a}$$

$$-1.25 < f1/f7 < -0.55 \tag{14a}$$

$$5.00 < r2/D1 < 10.50 \tag{15a}$$

$$0.60 < r2/r3 < 1.70 \tag{16a}$$

$$1.10 < r5/f < 4.50 \tag{17a}$$

$$-3.50 < r9/f < -1.75 \tag{18a}$$

$$0.25 < r11/f < 0.55. \tag{19a}$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$
[Equation 1]

Next, examples of the imaging lens according to this embodiment will be explained. In each example, f denotes a focal length of the overall optical system of the imaging lens, Fno denotes a F-number, ω denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 | |
|---|---|
| Unit mm | |
| f = | 6.803076 |
| Fno = | 1.69 |
| ω(°) = | 41.084 |
| Ih = | 6.016 |
| TTL = | 7.75761475 |

TABLE 1-continued

Example 1

Surface Data

| i | r | d | Nd | vd |
|---|---|---|---|---|
| (Object) | Infinity | Infinity | | |
| 1 (Stop) | Infinity | −0.891 | | |
| 2* | 2.53201 | 1.12198 | 1.544299 | 55.932898 (vd1) |
| 3* | 8.639813 | 0.1542895 | | |
| 4* | 10.90822 | 0.29 | 1.670745 | 19.238925 (vd2) |
| 5* | 5.456026 | 0.4894735 | | |
| 6* | 13.97149 | 0.4932144 | 1.614225 | 25.587089 (vd3) |
| 7* | 24.69818 | 0.391396 | | |
| 8* | Infinity | 0.3609902 | 1.670745 | 19.238925 (vd4) |
| 9* | Infinity | 0.5129428 | | |
| 10* | −14.09058 | 0.5263639 | 1.544299 | 55.982898 (vd5) |
| 11* | −59.14013 | 0.1820774 | | |
| 12* | 2.47584 | 0.58 | 1.534811 | 55.685662 (vd6) |
| 13* | 4.69058 | 0.9032554 | | |
| 14* | 64.15872 | 0.6940278 | 1.534811 | 55.685662 (vd7) |
| 15* | 3.038516 | 0.4 | | |
| 18 | Infinity | 0.21 | 1.516798 | 64.198266 |
| 19 | Infinity | 0.5191543 | | |
| Image Plan | Infinity | | | |

Constituent Lens Data

| Lens | Start Surface | Focal Length |
|---|---|---|
| 1 | 2 | 6.180184 |
| 2 | 4 | −16.629371 |
| 3 | 6 | 51.473307 |
| 4 | 8 | Infinity |
| 5 | 10 | −34.125209 |
| 6 | 12 | 8.984634 |
| 7 | 14 | −5.987616 |

Aspheric Surface Data

| | Second Surface | Third Surface | Fourth Surface | Fifth Surface | Sixth Surface | Seventh Surface | Eighth Surface |
|---|---|---|---|---|---|---|---|
| k | −0.07347752 | 3.887485 | 4.274321 | −17.26533 | 0 | 0 | −1.000726 |
| A4 | −0.007350124 | −0.025600489 | −0.051680298 | −0.026980867 | −0.029936299 | −0.022911786 | 0.005545966 |
| A6 | 0.016727195 | 0.01216932 | 0.041325944 | 0.050721778 | 0.030310832 | 0.001455306 | −0.055934667 |
| A8 | −0.019189441 | −0.00379899 | −0.020037629 | −0.037807779 | −0.067108538 | 0.00506548 | 0.055639145 |
| A10 | 0.013519792 | 0.000789781 | 0.010887306 | 0.012408522 | 0.09050288 | −0.020603644 | −0.038152458 |
| A12 | −0.00598185 | −0.000109263 | −0.006677716 | 0.012979672 | −0.07455881 | 0.027358467 | 0.017321951 |
| A14 | 0.001659517 | −7.81204E−06 | 0.003208465 | −0.018314502 | 0.037656322 | −0.01862522 | −0.004914551 |
| A16 | −0.0002792 | 7.17608E−06 | −0.000964738 | 0.009664702 | −0.011328795 | 0.006981059 | 0.000765153 |
| A18 | 2.58579E−05 | −1.09722E−06 | 0.000159978 | −0.00244944 | 0.001845613 | −0.001372275 | −4.01085E−05 |
| A20 | −1.03555E−06 | 2.84198E−08 | −1.11425E−05 | 0.000248357 | −0.00012243 | 0.000110889 | −2.47698E−06 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.005579 | 6.31494 | 2.34207 | −1 | −6.92228 | 1.927344 | −11.35404 |
| A4 | 0.005638703 | 0.026301146 | −0.041578235 | −0.034748332 | 0.03514441 | −0.060900698 | −0.031295247 |
| A6 | −0.021960964 | −0.015729995 | 0.015274116 | 0.00446897 | −0.019291536 | 0.016490266 | 0.006540811 |
| A8 | 0.004277223 | 0.004852265 | −0.00486144 | −0.002826077 | 0.004369233 | −0.002189494 | −0.000947891 |
| A10 | 0.004897517 | −0.001038249 | 0.001258953 | 0.000791673 | −0.000600712 | 0.000160414 | 8.97707E−05 |
| A12 | −0.004254442 | 0.000160452 | −0.000215468 | −0.00011206 | 5.43299E−05 | −6.27045E−06 | −5.46115E−06 |
| A14 | 0.001585406 | −1.70141E−05 | 2.29263E−05 | 9.1853E−05 | −3.31251E−05 | 8.77611E−08 | 2.10211E−07 |
| A16 | −0.000315175 | 1.14874E−06 | −1.46573E−06 | −4.45145E−07 | 1.32286E−07 | 2.30013E−09 | −4.92542E−09 |
| A18 | 3.23309E−05 | −4.38784E−08 | 5.17458E−08 | 1.1888E−08 | −3.12159E−09 | −1.03903E−10 | 6.42235E−11 |
| A20 | −1.3455E−06 | 7.15155E−10 | −7.77513E−10 | −1.35204E−10 | 3.28661E−11 | 1.13974E−12 | −3.61784E−13 |

The imaging lens in Example 1 satisfies conditional expressions (1) to (19) as shown in Table 8.

Figure 2:
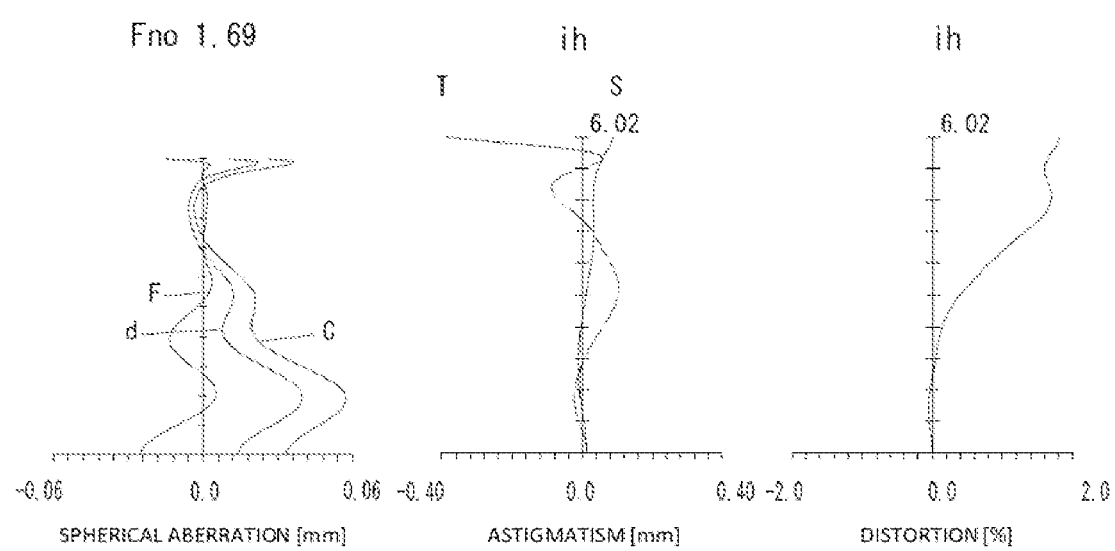
FIG. 2 shows spherical aberration, astigmatism, and distortion of the imaging lens in Example 1 according to the present invention.
Figure 3:
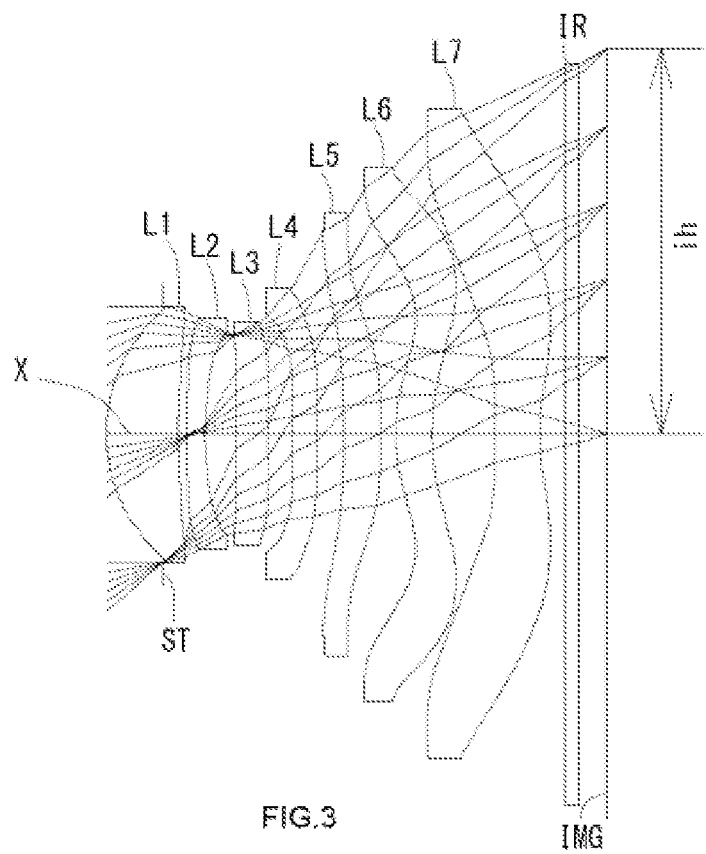
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6, 8, 10, 12 and 14). As shown in FIG. 2, each aberration is corrected excellently.

Example 2

The basic lens data is shown below in Table 2.

TABLE 2

Example 2

Unit mm

| | | |
|---|---|---|
| f = | | 6.773863 |
| Fno = | | 1.69 |
| ω(°) = | | 41.01 |
| Ih = | | 6.016 |
| TTL = | | 7.75819335 |

Surface Data

| i | r | d | Nd | vd |
|---|---|---|---|---|
| (Object) | Infinity | Infinity | | |
| 1 (Stop) | Infinity | −0.888 | | |
| 2* | 2.518911 | 1.131828 | 1.544299 | 55.932898 (vd1) |
| 3* | 8.941722 | 0.1253659 | | |
| 4* | 3.314226 | 0.2900847 | 1.670745 | 19.238925 (vd2) |
| 5* | 5.10902 | 0.48223 | | |
| 6* | 17.46835 | 0.5010955 | 1.614225 | 25.587089 (vd3) |
| 7* | 27.26157 | 0.3936296 | | |
| 8* | Infinity | 0.3713518 | 1.870745 | 19.238925 (vd4) |
| 9* | Infinity | 0.425323 | | |
| 10* | −14.3686 | 0.5749951 | 1.544299 | 55.932898 (vd5) |
| 11* | −62.094 | 0.2323459 | | |
| 12* | 2.538001 | 0.58 | 1.534811 | 55.685662 (vd6) |
| 13* | 4.773722 | 0.9831703 | | |
| 14* | 80.26044 | 0.69 | 1.534811 | 55.685662 (vd7) |
| 15* | 3.122038 | 0.4 | | |
| 18 | Infinity | 0.21 | 1.516798 | 64.198266 |
| 19 | Infinity | 0.438324 | | |
| Image Plan | Infinity | | | |

Constituent Lens Data

| Lens | Start Surface | Focal Length |
|---|---|---|
| 1 | 2 | 6.065992 |
| 2 | 4 | −17.351482 |
| 3 | 6 | 77.656117 |
| 4 | 8 | Infinity |
| 5 | 10 | −34.492546 |
| 6 | 12 | 9.292789 |
| 7 | 14 | −6.092907 |

Aspheric Surface Data

| | Second Surface | Third Surface | Fourth Surface | Fifth Surface | Sixth Surface | Seventh Surface | Eighth Surface |
|---|---|---|---|---|---|---|---|
| k | −0.08812344 | 3.845093 | 5.159984 | −15.34472 | 0 | 0 | −1.005812 |
| A4 | −0.003731963 | −0.032287564 | −0.053619797 | −0.00514651 | −0.016537964 | −0.027517439 | −0.003136485 |
| A6 | 0.009769956 | 0.022098176 | 0.0436895 | −0.012549055 | −0.01623757 | 0.02505164 | −0.037140871 |
| A8 | −0.010709789 | −0.013071406 | −0.020009898 | 0.086660375 | 0.03404414 | −0.044249342 | 0.031449532 |
| A10 | 0.007016637 | 0.007563688 | 0.009149174 | −0.13960639 | −0.039796481 | 0.041692589 | −0.017016939 |
| A12 | −0.002744568 | −0.003685277 | −0.005146152 | 0.13180045 | 0.030100859 | −0.021134114 | 0.004348558 |
| A14 | 0.000614721 | 0.001241267 | 0.002519111 | −0.07825371 | −0.015288788 | 0.004751701 | 0.000583771 |
| A16 | −6.86758E−05 | −0.000261431 | −0.00078301 | 0.028658911 | 0.005103906 | 0.000212331 | −0.000766793 |
| A18 | 1.83601E−06 | 3.0748E−05 | 0.000133333 | −0.005904099 | −0.001019599 | −0.00029828 | 0.00021073 |
| A20 | 1.42045E−07 | −1.55176E−06 | −9.46508E−06 | 0.00052475 | 9.93074E−05 | 3.93963E−05 | −2.07036E−05 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.007187 | 17.11115 | 2.341848 | −1 | −10.43757 | 1.825329 | −9.61698 |
| A4 | 0.000378249 | 0.008820892 | −0.057176366 | −0.039030637 | 0.03399528 | −0.055030384 | −0.030915853 |
| A6 | −0.016265308 | −0.005720498 | 0.025983073 | 0.009506992 | −0.016997648 | 0.013676906 | 0.006546666 |
| A8 | 0.002087726 | −8.79665E−05 | −0.010355686 | −0.004801944 | 0.003581968 | −0.001794303 | −0.001001411 |

TABLE 2-continued

| | | | Example 2 | | | | |
|---|---|---|---|---|---|---|---|
| A10 | 0.004244065 | 0.000638757 | 0.00298817 | 0.001314224 | −0.000463088 | 0.000138907 | 9.78148E−05 |
| A12 | −0.003232081 | −0.000172969 | −0.000540136 | −0.000205699 | 3.88779E−05 | −6.4989E−06 | −5.81519E−06 |
| A14 | 0.001138838 | 2.2103E−05 | 6.01965E−05 | 1.95828E−05 | −2.13008E−06 | 1.83007E−07 | 1.98638E−07 |
| A16 | −0.000217744 | −1.54453E−06 | −4.05293E−06 | −1.11957E−06 | 7.24926E−08 | −3.05053E−09 | −3.2915E−09 |
| A18 | 2.15309E−05 | 5.746E−08 | 1.51916E−07 | 3.52787E−08 | −1.33475E−09 | 3.05086E−11 | 8.39386E−12 |
| A20 | −8.59793E−07 | −9.02352E−10 | −2.44175E−09 | −4.70661E−10 | 9.28376E−12 | −1.8186E−13 | 2.93258E−13 |

The imaging lens in Example 2 satisfies conditional expressions (1) to (19) as shown in Table 8.

Figure 4:
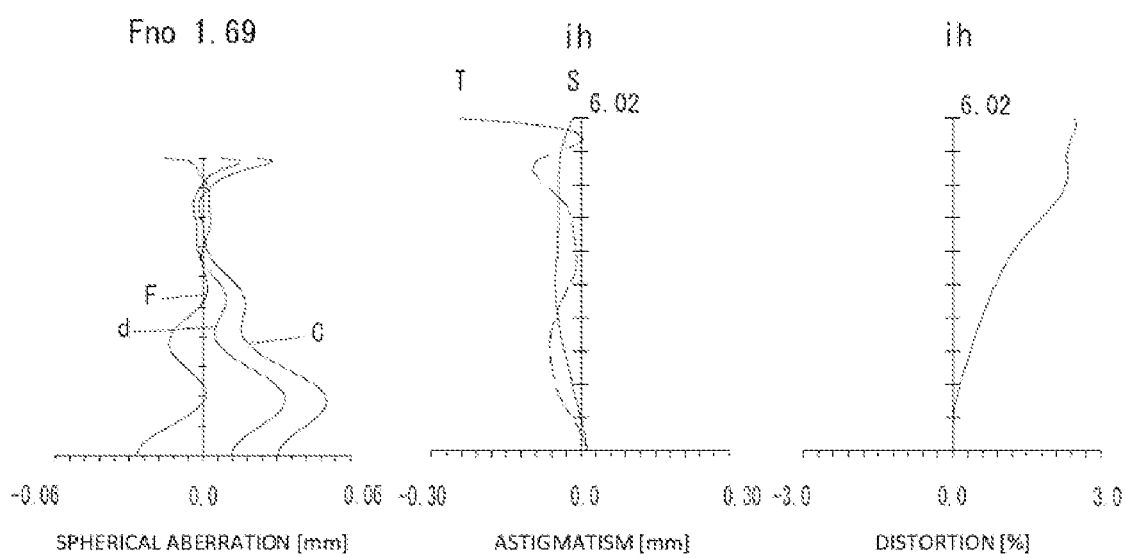
FIG. 4 shows spherical aberration, astigmatism, and distortion of the imaging lens in Example 2 according to the present invention.
Figure 5:
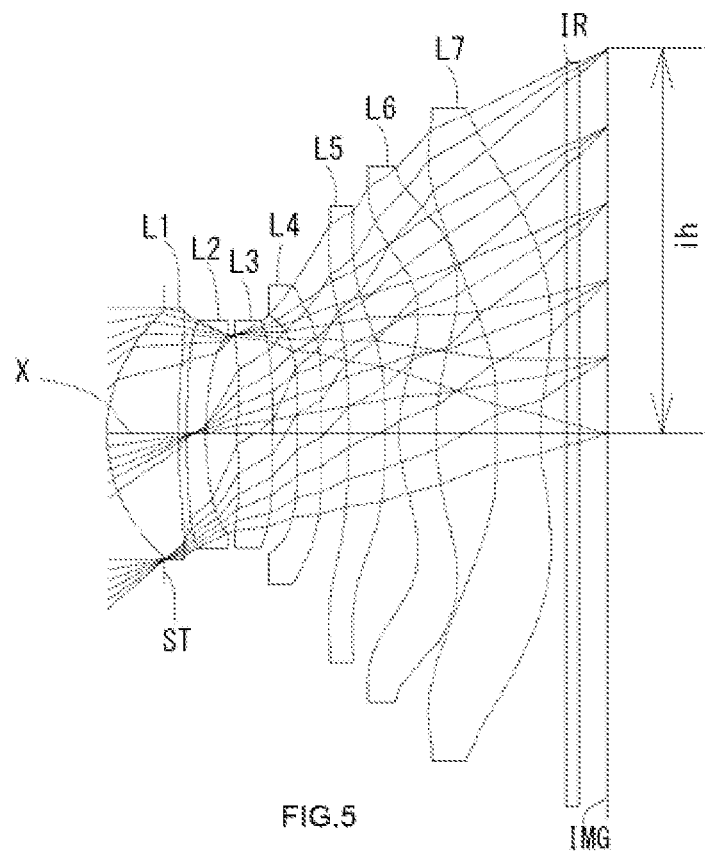
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3

Unit mm f = 6.770808
Fno = 1.69
ω(°) = 41.023
Ih = 6.016
TTL = 7.75832255

Surface Data

| i | r | d | Nd | vd |
|---|---|---|---|---|
| (Object) | Infinity | Infinity | | |
| 1 (Stop) | Infinity | −0.888 | | |
| 2* | 2.496081 | 1.114251 | 1.544299 | 55.932898 (vd1) |
| 3* | 8.899031 | 0.125583 | | |
| 4* | 8.857517 | 0.3047987 | 1.670745 | 19.238925 (vd2) |
| 5* | 4.854619 | 0.4941533 | | |
| 6* | 20.85753 | 0.5379855 | 1.614225 | 25.587089 (vd3) |
| 7* | 45.67846 | 0.4001133 | | |
| 8* | Infinity | 0.3723788 | 1.670745 | 19.238925 (vd4) |
| 9* | Infinity | 0.4243915 | | |
| 10* | −14.66946 | 0.5716882 | 1.544299 | 55.932898 (vd5) |
| 11* | −74.35687 | 0.2241847 | | |
| 12* | 2.622899 | 0.58 | 1.534811 | 55.685662 (vd6) |
| 13* | 5.147523 | 0.9423096 | | |
| 14* | 199.9315 | 0.69 | 1.534811 | 55.685662 (vd7) |
| 15* | 3.158481 | 0.4 | | |
| 18 | Infinity | 0.21 | 1.516798 | 64.198256 |
| 19 | Infinity | 0.438035 | | |
| Image Plan | Infinity | | | |

Constituent Lens Data

| Lens | Start Surface | Focal Length |
|---|---|---|
| 1 | 2 | 6.005253 |
| 2 | 4 | −16.520316 |
| 3 | 6 | 61.981446 |
| 4 | 8 | Infinity |
| 5 | 10 | −33.688656 |
| 6 | 12 | 9.258443 |
| 7 | 14 | −6.007927 |

Aspheric Surface Data

| | Second Surface | Third Surface | Fourth Surface | Fifth Surface | Sixth Surface | Seventh Surface | Eighth Surface |
|---|---|---|---|---|---|---|---|
| k | −0.08278618 | 3.844229 | 5.159953 | −15.34482 | 0 | 0 | −1.005051 |
| A4 | −0.006322692 | −0.035027879 | −0.052288142 | −0.011491919 | −0.017618302 | −0.020354535 | −0.004279957 |
| A6 | 0.016953593 | 0.030734108 | 0.043550625 | 0.022919296 | −0.008062352 | 0.003247202 | −0.03765404 |
| A8 | −0.021859115 | −0.024179264 | −0.019983246 | 0.010306534 | 0.019129167 | −0.005810474 | 0.036981038 |
| A10 | 0.017438565 | 0.015866349 | 0.006779823 | −0.044282488 | −0.025108545 | 0.00145484 | −0.026997055 |

TABLE 3-continued

| | | | Example 3 | | | | |
|---|---|---|---|---|---|---|---|
| A12 | −0.008852185 | −0.007535289 | −0.001927363 | 0.056333445 | 0.022069883 | 0.004852405 | 0.013914161 |
| A14 | 0.002876424 | 0.002362918 | 0.00057715 | −0.039843722 | −0.013276165 | −0.005720824 | −0.004851771 |
| A16 | −0.000581943 | −0.000460677 | −0.000160838 | 0.016480034 | 0.005183682 | 0.002767933 | 0.001044212 |
| A18 | 6.69767E−05 | 5.05771E−05 | 3.02105E−05 | −0.003713585 | −0.001169951 | −0.000642347 | −0.000116886 |
| A20 | −3.39564E−06 | −2.4167E−05 | −2.52704E−06 | 0.000354047 | 0.000115934 | 5.89421E−05 | 4.17725E−06 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.007046 | 16.98341 | 2.341277 | −1 | −10.49968 | 1.827164 | −9.616985 |
| A4 | 0.00342841 | 0.01293761 | −0.050987609 | −0.036812161 | 0.031219554 | −0.054932337 | −0.030943197 |
| A6 | −0.023464342 | −0.011464123 | 0.019382369 | 0.007277085 | −0.016248189 | 0.013537389 | 0.006527744 |
| A8 | 0.010549073 | 0.003330259 | −0.006984877 | −0.00366154 | 0.00359761 | −0.001741843 | −0.00098342 |
| A10 | −0.001287359 | −0.000462937 | 0.002602326 | 0.001037444 | −0.000503981 | 0.000128469 | 9.41053E−05 |
| A12 | −0.011013827 | 3.25118E−05 | −0.000366383 | −0.000168617 | 4.74114E−05 | −5.21515E−06 | −5.47033E−06 |
| A14 | 0.000579793 | −4.95733E−07 | 4.14E−05 | 1.66516E−05 | −3.02068E−06 | 8.71019E−08 | 1.84271E−07 |
| A16 | −0.000133761 | −1.09718E−07 | −2.82605E−06 | −9.82748E−07 | 1.24389E−07 | 1.13853E−09 | −3.16393E−09 |
| A18 | 1.49329E−05 | 9.20346E−09 | 1.07324E−07 | 3.1779E−08 | −2.92541E−09 | −6.73229E−11 | 1.60082E−11 |
| A20 | −6.63406E−07 | −2.43784E−10 | −1.74435E−09 | −4.32708E−10 | 2.91201E−11 | 7.57943E−13 | 1.31402E−13 |

The imaging lens in Example 3 satisfies conditional expressions (1) to (19) as shown in Table 8.

Figure 6:
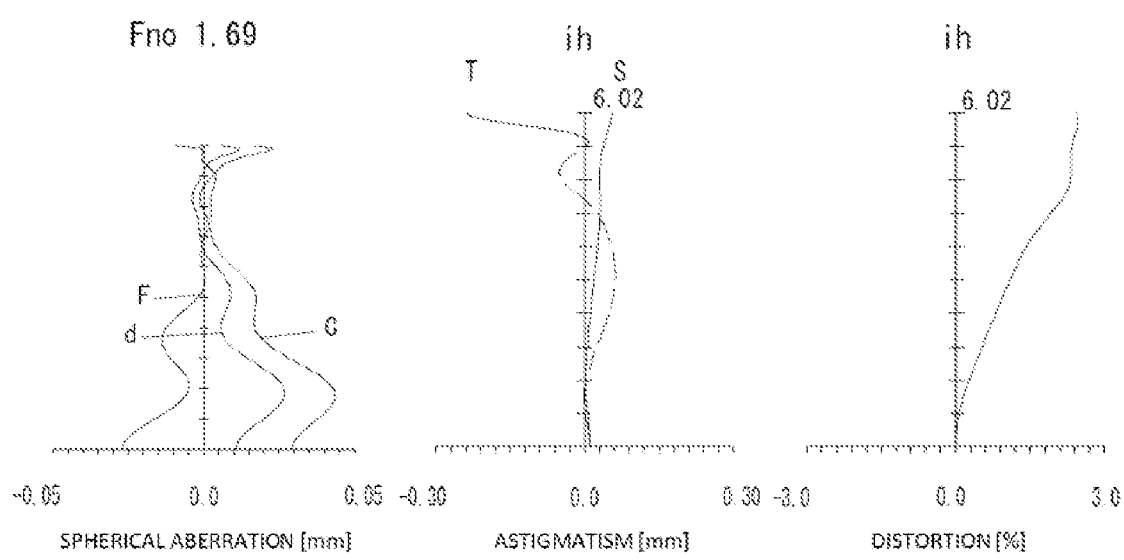
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

| Example 4 |
|---|

| Unit mm |
|---|

| | | |
|---|---|---|
| f = | | 6.779634 |
| Fno = | | 1.69 |
| ω(°) = | | 41.004 |
| Ih = | | 6.016 |
| TTL = | | 7.75796047 |

| Surface Data | | | | |
|---|---|---|---|---|
| i | r | d | Nd | vd |
| (Object) | Infinity | Infinity | | |
| 1 (Stop) | Infinity | −0.88 | | |
| 2* | 2.557015 | 1.110473 | 1.544299 | 55.932898 (vd1) |
| 3* | 10.42316 | 0.07713872 | | |
| 4* | 8.454484 | 0.3419092 | 1.670745 | 19.238925 (vd2) |
| 5* | 4.771833 | 0.5834469 | | |
| 6* | 21.06092 | 0.4394397 | 1.614225 | 25.587089 (vd3) |
| 7* | 33.70618 | 0.4230939 | | |
| 8* | Infinity | 0.37 | 1.670745 | 19.238925 (vd4) |
| 9* | Infinity | 0.2154749 | | |
| 10* | −17.30912 | 0.5744511 | 1.544299 | 55.932898 (vd5) |
| 11* | 64.78179 | 0.3314791 | | |
| 12* | 2.926076 | 0.58 | 1.534811 | 55.685662 (vd6) |
| 13* | 14.70311 | 6.7308326 | | |
| 14* | −365.2767 | 0.69 | 1.534811 | 55.685662 (vd7) |
| 15* | 2.759294 | 0.2797436 | | |
| 18 | Infinity | 0.21 | 1.516798 | 64.198266 |
| 19 | Infinity | 0.8120282 | | |
| Image Plan | Infinity | | | |

| Constituent Lens Data | | |
|---|---|---|
| Lens | Start Surface | Focal Length |
| 1 | 2 | 5.929861 |
| 2 | 4 | −16.964897 |
| 3 | 6 | 90.0437 |
| 4 | 8 | Infinity |
| 5 | 10 | −25.03373 |

TABLE 4-continued

Example 4

| | | | |
|---|---|---|---|
| 6 | 12 | 6.715356 | |
| 7 | 14 | −5.117356 | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | −0.07104276 | 3.782298 | 5.155078 | −15.34232 | 0 | 0 | −1.003474 |
| A4 | −0.005559161 | −0.030657347 | −0.049758305 | −0.001188272 | −0.015378999 | −0.02763788 | 0.024475197 |
| A6 | 0.014891101 | 0.015067192 | 0.044145649 | 0.009921845 | −0.015370025 | 0.022830163 | −0.09340872 |
| A8 | −0.018948867 | 0.003148465 | −0.030739753 | 0.01570637 | 0.01548031 | −0.04838116 | 0.10847648 |
| A10 | 0.015252615 | −0.008098064 | 0.023777973 | −0.044174921 | 0.00056177 | 0.053752374 | −0.086417351 |
| A12 | −0.007937978 | 0.004900069 | −0.016107692 | 0.054149578 | −0.016351939 | −0.034836893 | 0.047006566 |
| A14 | 0.002687909 | −0.001592422 | 0.007545357 | −0.038242304 | 0.015877016 | 0.013114435 | −0.017080142 |
| A16 | −0.00574397 | 0.000293197 | −0.00217824 | 0.015902958 | −0.007130633 | −0.0026644 | 0.003939559 |
| A18 | 7.06993E−05 | −2.77827E−05 | 0.000347878 | −0.003611004 | 0.001589115 | 0.000227108 | −0.000518113 |
| A20 | −3.8569E−06 | 9.42082E−07 | −2.434885E−05 | 0.000347244 | −0.000139752 | 0 | 2.91784E−05 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.00619 | 20.83668 | 2.342958 | −1 | −9.876018 | 1.826285 | −9.875444 |
| A4 | 0.03958513 | 0.010976101 | −0.073855639 | −0.02901733 | 0.034796173 | −0.07222968 | −0.037949093 |
| A6 | −0.073649716 | −0.02446091 | 0.023783305 | 0.001959176 | −0.015164867 | 0.023775793 | 0.010471105 |
| A8 | 0.051881064 | 0.001499428 | −0.006969182 | −0.001232613 | 0.002755878 | −0.004329768 | −0.001968125 |
| A10 | −0.023312144 | −0.002664949 | 0.001986509 | 0.000292458 | −0.000306554 | 0.000503388 | 0.000240764 |
| A12 | 0.006872345 | 0.000364355 | −0.000376487 | −3.02299E−05 | 2.22503E−05 | 3.85628E−05 | −1.91458E−05 |
| A14 | −0.001275447 | −3.05839E−05 | 4.27485E−05 | 1.61519E−06 | −1.02409E−06 | 1.94079E−06 | 9.7527E−07 |
| A16 | 0.000137907 | 1.54337E−06 | 2.8266E−06 | −4.48645E−08 | 2.67825E−08 | −6.18001E−08 | −3.04811E−08 |
| A18 | −7.45121E−06 | −4.28115E−08 | 1.00793E−07 | 5.62047E−10 | −2.93442E−10 | 1.1285E−09 | 5.2977E−10 |
| A20 | 1.31237E−07 | 4.99564E−10 | −1.50189E−09 | −1.81142E−12 | −2.1266E−13 | −8.99207E−12 | −3.90927E−12 |

The imaging lens in Example 4 satisfies conditional expressions (1) to (19) as shown in Table 8.

Figure 8:
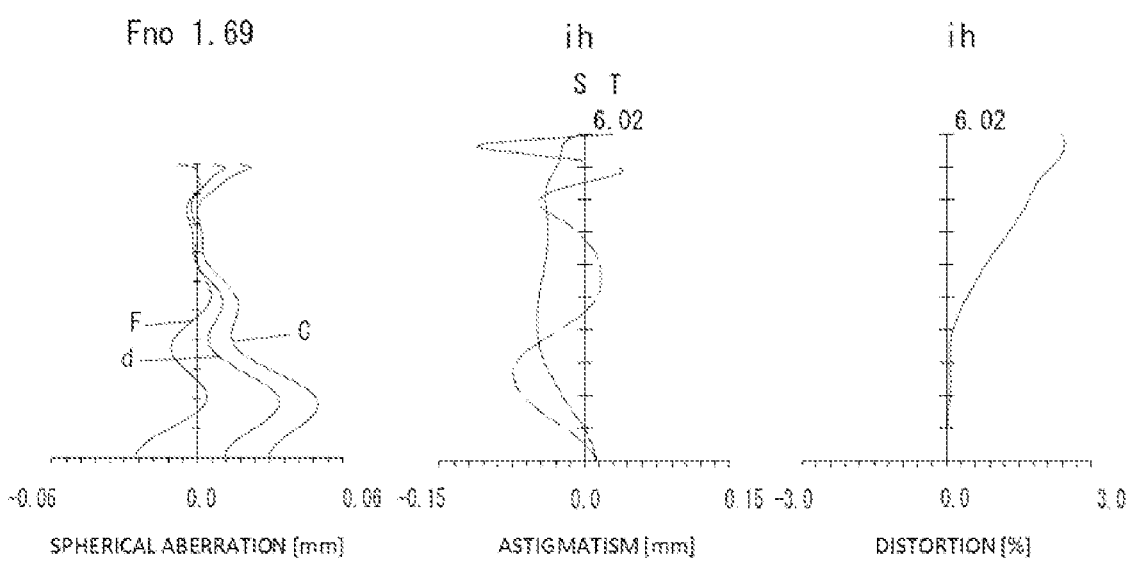
FIG. 8 shows spherical aberration, astigmatism, and distortion of the imaging lens in Example 4 according to the present invention.
Figure 9:
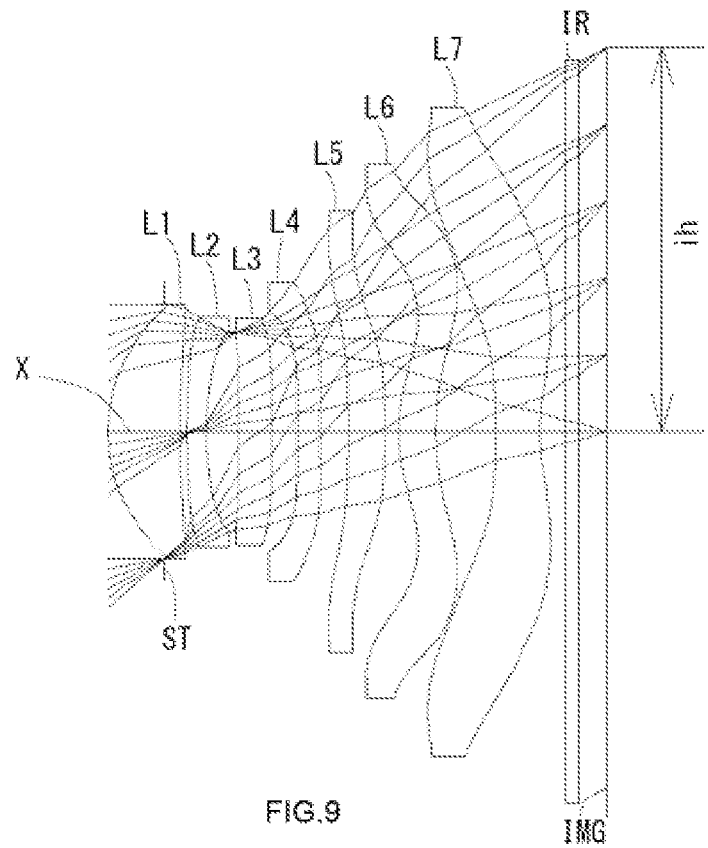
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5

Unit mm

| | | |
|---|---|---|
| f = | | 6.770855 |
| Fno = | | 1.69 |
| ω(°) = | | 41.023 |
| Ih = | | 6.016 |
| TTL = | | 7.75821165 |

Surface Data

| i | r | d | Nd | vd |
|---|---|---|---|---|
| (Object) | Infinity | Infinity | | |
| 1 (Stop) | Infinity | −0.8879984 | | |
| 2* | 2.509812 | 1.127446 | 1.544299 | 55.932898 (vd1) |
| 3* | 9.125468 | 0.1167379 | | |
| 4* | 9.005614 | 0.3068665 | 1.670745 | 19.238925 (vd2) |
| 5* | 4.867631 | 0.4859896 | | |
| 6* | 18.82478 | 0.5353886 | 1.614225 | 25.587089 (vd3) |
| 7* | 34.22587 | 0.393434 | | |
| 8* | 56.43586 | 0.370476 | 1.670745 | 19.238925 (vd4) |
| 9* | 67.54924 | 0.4395522 | | |
| 10* | −14.61641 | 0.569478 | 1.544299 | 55.932898 (vd5) |
| 11* | −71.20215 | 0.2250424 | | |
| 12* | 2.644026 | 0.5815631 | 1.534811 | 55.685662 (vd6) |
| 13* | 5.214742 | 0.9347137 | | |
| 14* | 173.1204 | 0.6950517 | 1.534811 | 55.685662 (vd7) |
| 15* | 3.142308 | 0.4 | | |

TABLE 5-continued

Example 5

| | | | | |
|---|---|---|---|---|
| 18 | Infinity | 0.21 | 1.516798 | 64.158266 |
| 19 | Infinity | 0.4370224 | | |
| Image Plan | Infinity | | | |

Constituent Lens Data

| Lens | Start Surface | Focal Length |
|---|---|---|
| 1 | 2 | 6.000025 |
| 2 | 4 | −16.278373 |
| 3 | 6 | 67.217654 |
| 4 | 8 | 504.659312 |
| 5 | 10 | −33.910383 |
| 6 | 12 | 9.295889 |
| 7 | 14 | −5.992719 |

Aspheric Surface Data

| | Second Surface | Third Surface | Fourth Surface | Fifth Surface | Sixth Surface | Seventh Surface | Eighth Surface |
|---|---|---|---|---|---|---|---|
| k | −0.09043937 | 3.844165 | 5.159984 | −15.34488 | 0 | 0 | −1.005051 |
| A4 | −0.00537928 | −0.032405071 | −0.052590773 | −0.010557209 | −0.017245495 | −0.022946495 | −0.001983802 |
| A6 | 0.013577599 | 0.021678107 | 0.04429043 | 0.017650492 | −0.010223935 | 0.011469623 | −0.046877363 |
| A8 | −0.01576604 | −0.01032903 | −0.021974392 | 0.025670321 | 0.02545774 | −0.021226624 | 0.56489461 |
| A10 | 0.011249996 | 0.003835683 | 0.010287346 | −0.069406652 | −0.035211755 | 0.019051925 | −0.051314922 |
| A12 | −0.00507061 | −0.00192965 | −0.005218752 | 0.080930876 | 0.031758995 | −0.007648666 | 0.032663142 |
| A14 | 0.01448647 | 0.00191984 | 0.002321857 | −0.054649325 | −0.018944365 | −0.000151443 | −0.013842601 |
| A16 | −0.000255388 | −1.20346E−05 | −0.000690017 | 0.021848256 | 0.007159287 | 0.001255276 | 0.003651413 |
| A18 | 2.54029E−05 | −1.44901E−06 | 0.000115974 | −0.00479004 | −0.0015471 | −0.000413695 | −0.000535424 |
| A20 | −1.13021E−06 | 1.85364E−07 | −8.27852E−06 | 0.00044573 | 0.000146292 | 4.42132E−05 | 3.27634E−05 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.007046 | 17.0727 | 2.341277 | −1 | −10.68759 | 1.827164 | −9.617484 |
| A4 | 0.003067877 | 0.012507641 | −0.050849178 | −0.035973667 | 0.031459127 | −0.054961818 | −0.031019908 |
| A6 | −0.2289047 | −0.011336874 | 0.019145396 | 0.006739538 | −0.016376351 | 0.013539568 | 0.006619029 |
| A8 | 0.00970119 | 0.003476938 | −0.006826084 | −0.003433627 | 0.003650452 | −0.00173877 | −0.00101698 |
| A10 | −0.000493459 | −0.000566596 | 0.001943334 | 0.000971588 | −0.00518633 | 0.000127388 | 0.000100268 |
| A12 | −0.001454243 | 0.000059264 | −0.000353022 | −0.000157132 | 4.98242E−05 | −5.05879E−06 | −6.12711E−06 |
| A14 | 0.000723377 | −4.03835E−06 | 3.95257E−05 | 1.54695E−05 | −3.2556E−06 | 7.5117E−08 | 2.26342E−07 |
| A16 | −0.000161286 | 1.47937E−07 | −2.66851E−07 | −9.1227E−07 | 1.37723E−07 | 1.64896E−08 | −4.75382E−09 |
| A18 | 1.78253E−05 | −6.20113E−10 | 1.00104E−08 | 2.95264E−08 | −3.33422E−09 | −7.8765E−11 | 4.85604E−11 |
| A20 | −7.9125E−07 | −8.96671E−11 | −1.60622E−10 | −4.02826E−10 | 3.4357E−11 | 8.6354E−13 | −1.46317E−1 |

The imaging lens in Example 5 satisfies conditional expressions (1) to (19) as shown in Table 8.

Figure 10:
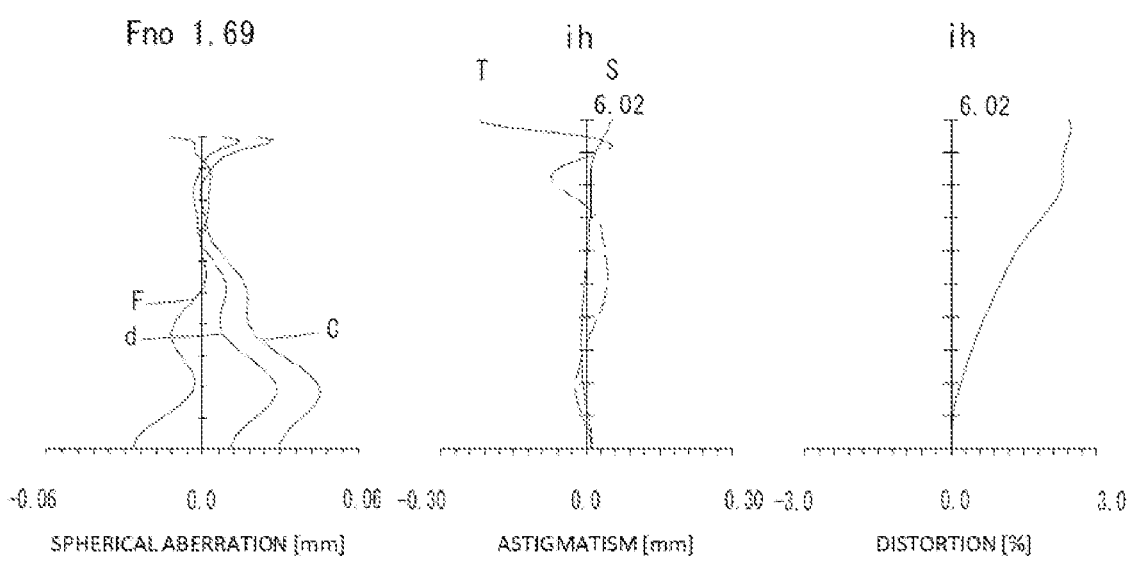
FIG. 10 shows spherical aberration, astigmatism, and distortion of the imaging lens in Example 5 according to the present invention.
Figure 11:
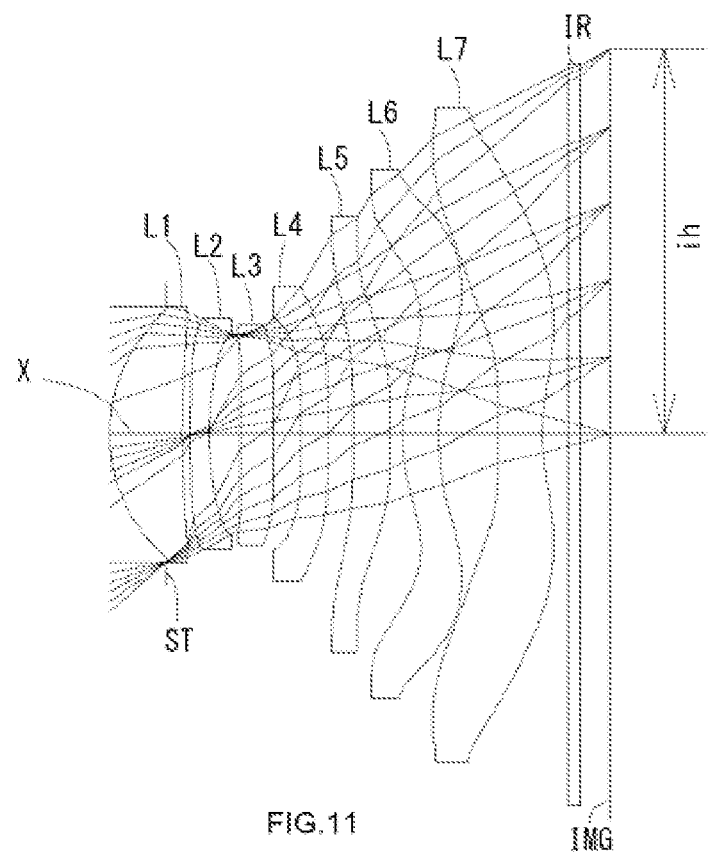
FIG. 11 is a schematic view showing an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example 6

Unit mm

| | |
|---|---|
| f = | 6.771914 |
| Fno = | 1.69 |
| ω(°) = | 40.995 |
| Ih = | 6.016 |
| TTL = | 7.75830995 |

TABLE 6-continued

Example 6

Surface Data

| i | r | d | Nd | νd |
|---|---|---|---|---|
| (Object) | Infinity | Infinity | | |
| 1 (Stop) | Infinity | −0.888 | | |
| 2* | 2.506422 | 1.134559 | 1.544299 | 55.932898 (vd1) |
| 3* | 9.090486 | 0.120017 | | |
| 4* | 9.336791 | 0.2985437 | 1.670745 | 19.238925 (vd2) |
| 5* | 5.009094 | 0.4781922 | | |
| 6* | 16.73058 | 0.5251965 | 1.614225 | 25.587089 (vd3) |
| 7* | 52.45842 | 0.4350602 | | |
| 8* | −41.48398 | 0.4213664 | 1.670745 | 19.238925 (vd4) |
| 9* | −334.416 | 0.4041946 | | |
| 10* | −14.70785 | 0.5740224 | 1.544299 | 55.932898 (vd5) |
| 11* | −52.01047 | 0.1808198 | | |
| 12* | 2.601331 | 0.58 | 1.534811 | 55.685662 (vd6) |
| 13* | 5.005743 | 0.9272682 | | |
| 14* | 61.80569 | 0.69 | 1.534811 | 55.685662 (vd7) |
| 15* | 5.074689 | 0.4 | | |
| 18 | Infinity | 0.21 | 1.516798 | 64.198266 |
| 19 | Infinity | 0.4406204 | | |
| Image Plan | Infinity | | | |

Constituent Lens Data

| Lens | Start Surface | Focal Length |
|---|---|---|
| 1 | 2 | 5.993809 |
| 2 | 4 | −16.570666 |
| 3 | 6 | 39.77128 |
| 4 | 8 | −70.647044 |
| 5 | 10 | −37.881316 |
| 6 | 12 | 9.341216 |
| 7 | 14 | −6.074961 |

Aspheric Surface Data

| | Second Surface | Third Surface | Fourth Surface | Fifth Surface | Sixth Surface | Seventh Surface | Eighth Surface |
|---|---|---|---|---|---|---|---|
| k | −0.09834336 | 3.845093 | 5.159984 | −15.34472 | 0 | 0 | −1.005812 |
| A4 | −0.004294709 | −0.032672189 | −0.052532796 | −0.007440736 | −0.022185708 | −0.02238911 | −0.001963711 |
| A6 | 0.010950214 | 0.026447794 | 0.043851122 | −0.004811706 | −0.007540934 | 0.011333516 | −0.05736211 |
| A8 | −0.01204669 | −0.020063239 | −0.02170938 | 0.074740488 | −0.01199437 | −0.01994768 | 0.07896484 |
| A10 | 0.007961083 | 0.013293355 | 0.010150758 | −0.013165186 | 0.013652124 | 0.01501738 | −0.071331085 |
| A12 | −0.003151523 | −0.006512213 | −0.005005718 | 0.13101496 | −0.009307702 | −0.004087624 | 0.041022853 |
| A14 | 0.000726723 | 0.002102356 | 0.002139158 | −0.080491122 | 0.003175516 | −0.002335783 | −0.0147621 |
| A16 | 8.80836E−05 | 0.000418473 | −0.00061282 | 0.030140572 | −0.000188119 | 0.00204255 | 0.003140861 |
| A18 | 3.749937E−06 | 4.62957E−05 | 9.99748E−05 | −0.006297532 | −0.000179287 | −0.000569069 | −0.000344114 |
| A20 | 6.619858E−05 | −2.1843E−06 | −6.96523E−06 | 0.000564491 | 3.72699E−05 | 5.71453E−05 | 1.29187E−05 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.007187 | 17.45622 | 2.341848 | −1 | −10.43757 | 1.825329 | −9.61698 |
| A4 | −0.007996109 | 0.009559784 | −0.056080189 | −0.037759097 | 0.037585127 | −0.055187219 | −0.030643002 |
| A6 | −0.0081875 | −0.007786258 | 0.024175002 | 0.007637768 | −0.020376227 | 0.013683531 | 0.006425373 |
| A8 | −0.001022445 | 0.001733356 | −0.009080394 | −0.004077068 | 0.004902824 | −0.001785225 | −0.000992688 |
| A10 | 0.004374001 | −0.000161513 | 0.002560475 | 0.00118953 | −0.000754176 | 0.000135621 | 0.000100194 |
| A12 | −0.002797954 | 1.52275E−05 | −0.000462453 | −0.000195077 | 7.85848E−05 | −5.94286E−06 | −6.3473E−06 |
| A14 | 0.000924326 | −2.99227E−06 | 5.20386E−05 | 1.92228E−05 | −5.55508E−06 | 1.32548E−07 | 2.47553E−07 |

TABLE 6-continued

| | | | Example 6 | | | | |
|---|---|---|---|---|---|---|---|
| A16 | −0.000169279 | 3.64902E−07 | −3.55295E−06 | −1.12683E−06 | 2.53767E−07 | −5.55075E−10 | −5.69207E−09 |
| A18 | 1.61326E−05 | −1.99507E−08 | 1.35099E−07 | 3.61484E−08 | −6.68444E−09 | −3.28046E−11 | 6.92644E−11 |
| A20 | −6.21389E−07 | 3.96355E−10 | −2.19753E−09 | −4.88362E−10 | 7.64548E−11 | 4.63165E−13 | −3.29713E−13 |

The imaging lens in Example 6 satisfies conditional expressions (1) to (19) as shown in Table 8.

Figure 12:
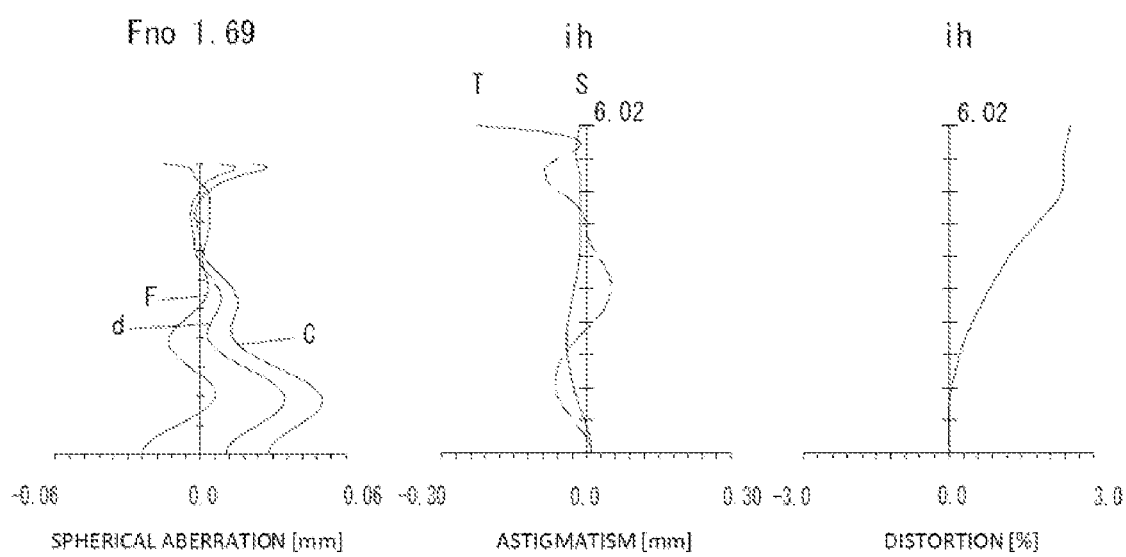
FIG. 12 shows spherical aberration, astigmatism, and distortion of the imaging lens in Example 6 according to the present invention.
Figure 13:
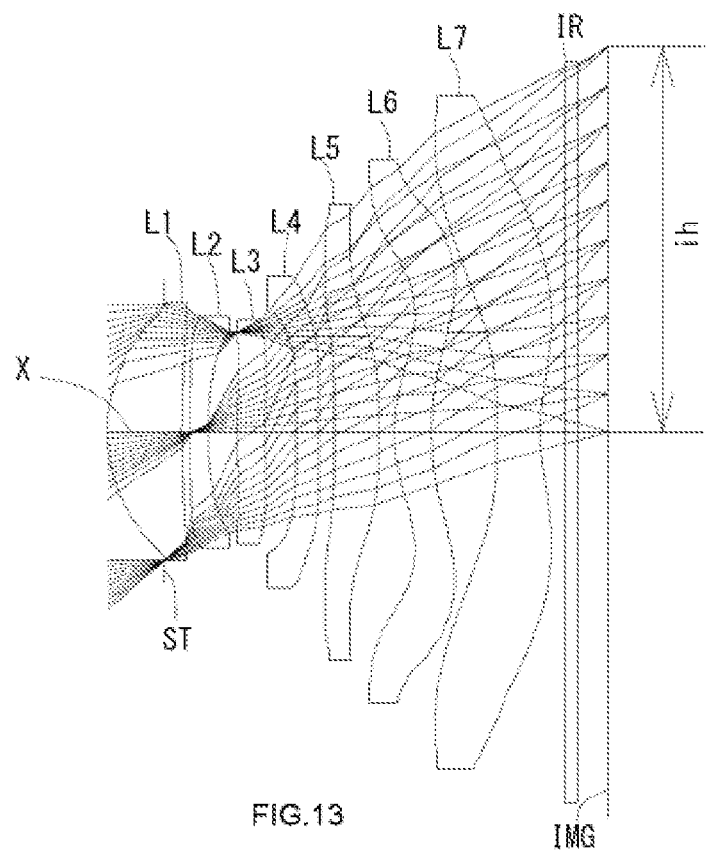
FIG. 13 is a schematic view showing an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

Example 7

Unit mm

| | |
|---|---|
| f = | 06.770398 |
| Fno = | 1.69 |
| ω(°) = | 40.995 |
| Ih = | 6.016 |
| TTL= | 7.75771755 |

Surface Data

| i | r | d | Nd | vd |
|---|---|---|---|---|
| (Object) | Infinity | Infinity | | |
| 1 (Stop) | Infinity | −0.888 | | |
| 2* | 2.501424 | 1.158516 | 1.544299 | 55.932898 (vd1) |
| 3* | 9.88978 | 0.1236314 | | |
| 4* | 10.49189 | 0.29 | 1.670745 | 19.238925 (vd2) |
| 5* | 4.912779 | 5.4590122 | | |
| 6* | 10.92504 | 0.4384183 | 1.614225 | 25.587089 (vd3) |
| 7* | 14.65252 | 0.478518 | | |
| 8* | Infinity | 0.3600584 | 1.544299 | 55.932898 (vd4) |
| 9* | Infinity | 0.2447086 | | |
| 10* | −15.50718 | 0.688895 | 1.544299 | 55.932898 (vd5) |
| 11* | −177.199 | 0.2448851 | | |
| 12* | 2.517837 | 0.5801353 | 1.534811 | 55.685662 (vd6) |
| 13* | 4.946748 | 1.013653 | | |
| 14* | 37.79535 | 0.69 | 1.534811 | 55.685662 (vd7) |
| 15* | 3.030972 | 0.3777844 | | |
| 18 | Infinity | 0.21 | 1.516798 | 64.198266 |
| 19 | Infinity | 0.4710523 | | |
| Image Plan | Infinity | | | |

Constituent Lens Data

| Lens | Start Surface | Focal Length |
|---|---|---|
| 1 | 2 | 5.828436 |
| 2 | 4 | −14.067505 |
| 3 | 6 | 66.923432 |
| 4 | 8 | Infinity |
| 5 | 10 | −31.259521 |
| 6 | 12 | 8.851485 |
| 7 | 14 | −6.204397 |

Aspheric Surface Data

| | Second Surface | Third Surface | Fourth Surface | Fifth Surface | Sixth Surface | Seventh Surface | Eighth Surface |
|---|---|---|---|---|---|---|---|
| k | −0.1006837 | 3.845287 | 5.160474 | −15.34498 | 0 | 0 | −1.008992 |
| A4 | −0.00856896 | −0.030156388 | −0.06160845 | −0.01930066 | −0.013134982 | −0.028190501 | 0.021845999 |
| A6 | 0.019974297 | 0.009250194 | 0.050034562 | 0.027321561 | −0.041001365 | 0.03064697 | −0.090794153 |
| A8 | −0.023163429 | −0.030156388 | −0.012513557 | 0.020516614 | 0.090681277 | −0.057078343 | 0.11179591 |
| A10 | 0.016582467 | −0.013263685 | −0.00592651 | −0.059954538 | −0.11632992 | 0.060351814 | −0.096824594 |
| A12 | −0.007466064 | 0.007271168 | 0.006058785 | 0.065548569 | 0.095294618 | −0.037789061 | 0.057339062 |

TABLE 7-continued

Example 7

| | | | | | | | |
|---|---|---|---|---|---|---|---|
| A14 | 0.002106743 | −0.002305045 | −0.002127992 | −0.042111281 | −0.050660367 | 0.013803164 | −0.022419878 |
| A16 | −0.000359813 | 0.00043365 | 0.000349221 | 0.016430193 | 0.016923024 | −0.002726828 | 0.00545547 |
| A18 | 3.37888E−05 | −4.49623E−05 | −1.87566E−05 | −0.003585153 | −0.003233292 | 0.000225889 | −0.000739455 |
| A20 | −1.37632E−06 | 1.96471E−06 | −7.41006E−07 | 0.000336952 | 0.000271074 | 0 | 4.2019E−05 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.006953 | 16.97219 | 2.342713 | −1 | −10.76761 | 1.823497 | −9.617023 |
| A4 | 0.030315978 | 0.025909538 | −0.054234031 | −0.03446653 | 0.036389016 | −0.05485441 | −0.028957878 |
| A6 | −0.047347801 | −0.020833256 | 0.0212621 | 0.005574061 | −0.018618988 | 0.013043284 | 0.005702946 |
| A8 | 0.019251582 | 0.006094945 | −0.007616384 | −0.002981127 | 0.004220413 | −0.001584185 | −0.000796303 |
| A10 | −0.001050253 | −0.000645642 | 0.002134249 | 0.000842762 | −0.00060963 | 0.000105491 | 7.22162E−05 |
| A12 | −0.002508986 | −2.9838E−05 | −0.000376148 | −0.000132796 | 5.95549E−05 | −3.36845E−06 | −4.14812E−06 |
| A14 | 0.001194909 | 1.4291E−05 | 4.02915E−05 | 1.27106E−05 | −3.94227E−06 | 1.75847E−09 | 1.48446E−07 |
| A16 | −0.000242947 | −1.46511E−06 | −2.57154E−06 | −7.32816E−07 | 1.68033E−07 | 3.31588E−09 | −3.13146E−09 |
| A18 | 2.63484E−05 | 6.79891E−08 | 9.03695E−08 | 2.33423E−08 | −4.09115E−09 | −9.37933E−11 | 3.3737E−11 |
| A20 | −1.09481E−06 | −1.23984E−09 | −1.34996E−09 | −3.15249E−10 | 4.25573E−11 | 8.5214E−13 | −1.22512E−13 |

The imaging lens in Example 7 satisfies conditional expressions (1) to (19) as shown in Table 8.

Figure 14:
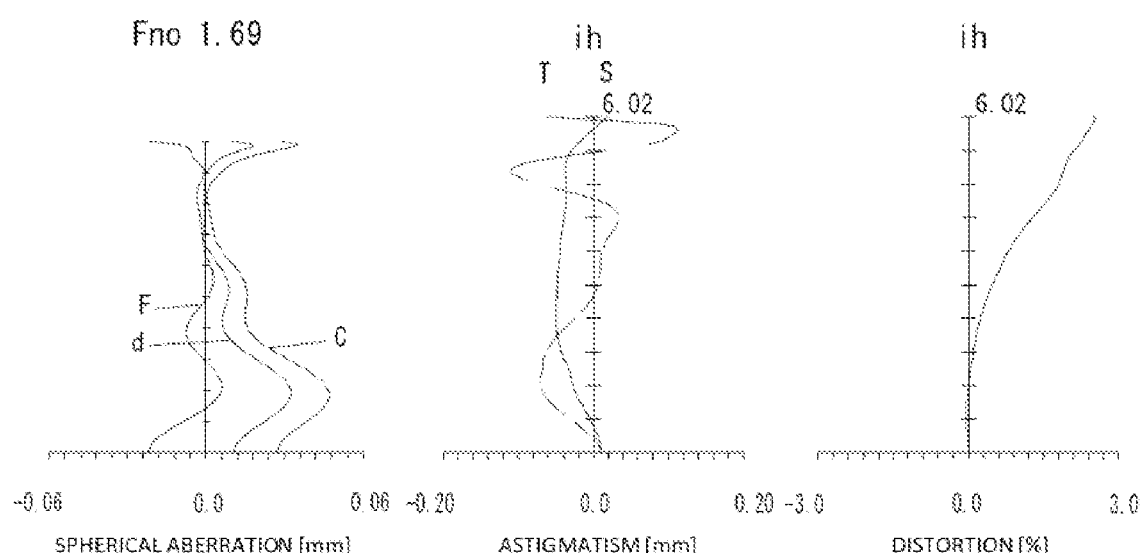
FIG. 14 shows spherical aberration, astigmatism, and distortion of the imaging lens in Example 7 according to the present invention.

FIG. 14 shows spherical aberration (mm), astigmatism (mm), and distortion (%) of the imaging lens in Example 7. As shown in FIG. 14, each aberration is corrected excellently.

In table 8, values of conditional expressions (1) to (19) related to Examples 1 to 7 are shown.

TABLE 8

| | Conditional Expressions | Example 1 | Example 2 | Example 3 | Example 4 | Example 5 | Example 6 | Example 7 |
|---|---|---|---|---|---|---|---|---|
| (1) | $vds$ | 55.932898 | 55.932898 | 55.932898 | 55.932898 | 55.932989 | 55.932898 | 55.932898 |
| (2) | $|r10|/f$ | 8.693145571 | 9.166704434 | 10.98197881 | 9.555352103 | 10.5159762 | 7.680320512 | 26.17261201 |
| (3) | $vd3$ | 25.587089 | 25.587089 | 25.287089 | 25.587089 | 25.587089 | 25.587089 | 25.587089 |
| (4) | $T6/T5$ | 4.960832042 | 4.231494078 | 4.203273462 | 2.204762231 | 4.153500407 | 5.128134198 | 4.13900431 |
| (5) | $f5/f$ | −5.016144021 | −5.092005295 | −5.75573964 | −3.369248989 | −5.008286693 | −5.59388616 | −4.618564669 |
| (6) | $f2/f7$ | 2.777294168 | 2.84781665 | 2.749753118 | 3.315168439 | 2.716358468 | 2.272699157 | 2.267344433 |
| (7) | $r4/T2$ | 11.14672398 | 10.59457106 | 9.82411531 | 8.178692868 | 10.01591598 | 10.47506421 | 10.780293774 |
| (8) | $r6/f$ | 3.630443053 | 4.024523378 | 6.746382411 | 4.971681362 | 5.055029239 | 7.746468724 | 2.164203641 |
| (9) | $r12/f$ | 0.689479288 | 0.704726683 | 0.760252395 | 2.168717367 | 0.770175702 | 0.739191756 | 0.730643605 |
| (10) | $D3/T3$ | 1.260141647 | 1.273012751 | 1.344582897 | 1.180446468 | 1.360809183/ | 1.207181213 | 0.916200227 |
| (11) | $(T3/TTL) \times 100$ | 5.045313703 | 5.073727636 | 5.157214043 | 5.453674347 | 5.071194468 | 5.60766717 | 6.168283351 |
| (12) | $T3/D4$ | 1.084228879 | 1.059991092 | 1.074479267 | 1.143497027 | 1.061968926 | 1.032489557 | 1.329001073 |
| (13) | $D4/D7$ | 0.520137954 | 0.538191014 | 0.53967942 | 0.536231884 | 0.532253567 | 0.610675942 | 0.521823768 |
| (14) | $f1/f7$ | −1.032161047 | −0.995582568 | −0.999554921 | −1.158774375 | −1.001219146 | −0.98664156 | −0.939565279 |
| (15) | $r2/D1$ | 7.706510704 | 7.900248094 | 7.986558684 | 9.386234514 | 8.093929111 | 8.012351936 | 8.536593366 |
| (16) | $r2/r3$ | 0.79204664 | 0.960006983 | 1.004686867 | 1.232855843 | 1.013308809 | 0.973619951 | 0.942611865 |
| (17) | $r5/f$ | 2.053701884 | 2.578787023 | 3.086508264 | 3.106498079 | 2.780266303 | 2.470583649 | 1.613648119 |
| (18) | $r9/f$ | −2.0711207201 | −2.121182551 | −2.166574506 | −2.553105374 | −2.158724415 | −2.171889661 | −2.290438465 |
| (19) | $r11/f$ | 0.363929493 | 0.374675573 | 0.387383456 | 0.43159793 | 0.390501052 | 0.384135268 | 0.371889068 |

When the imaging lens according to the present invention is adopted to a product with the camera function, there is realized contribution to the low profile and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
L7: seventh lens
ih: maximum image height
IR: filter
IMG: imaging plane

What is claimed is:

1. An imaging lens comprising in order from an object side to an image side,
a first lens with positive refractive power having an object-side surface being convex in a paraxial region,
a second lens with negative refractive power in a paraxial region,
a third lens with positive refractive power in a paraxial region,
a fourth lens,
a fifth lens with negative refractive power in a paraxial region,
a sixth lens with positive refractive power having an object-side surface being convex in a paraxial region, and
a seventh lens with negative refractive power having an image-side surface being concave in a paraxial region,
wherein the following conditional expressions (1), (2), (5'), and (17') are satisfied:

$$40.00 < vd5 < 72.00 \quad (1)$$

$$3.30 < |r10|/f \quad (2)$$

$$-8.50 < f5/f \leq -4.62 \tag{5'}$$

$$1.61 \leq r5/f \leq 3.11 \tag{17'}$$

where vd5: an abbe number at d-ray of the fifth lens,
r10: a paraxial curvature radius of an image-side surface of the fifth lens,
f5: a focal length of the fifth lens,
r5: a paraxial curvature radius of an object-side surface of the third lens, and
f: a focal length of the overall optical system of the imaging lens.

2. The imaging lens according to claim 1, wherein an image-side surface of said third lens is concave in the paraxial region.

3. The imaging lens according to claim 1, wherein an image-side surface of said sixth lens is concave in the paraxial region.

4. The imaging lens according to claim 1, wherein the following conditional expression (3) is satisfied:

$$9.00 < vd3 < 39.00 \tag{3}$$

where vd3: an abbe number at d-ray of the third lens.

5. The imaging lens according to claim 1, wherein the following conditional expression (4) is satisfied:

$$1.50 < T6/T5 < 8.00 \tag{4}$$

where

T6: a distance along the optical axis from an image-side surface of the sixth lens to an object-side surface of the seventh lens, and
T5: a distance along the optical axis from an image-side surface of the fifth lens to an object-side surface of the sixth lens.

6. The imaging lens according to claim 1, wherein the following conditional expression (6) is satisfied:

$$1.45 < f2/f7 < 4.50 \tag{6}$$

where f2: a focal length of the second lens, and
f7: a focal length of the seventh lens.

7. The imaging lens according to claim 1, wherein the following conditional expression (7) is satisfied:

$$6.00 < r4/T2 < 14.00 \tag{7}$$

where r4: a paraxial curvature radius of an image-side surface of the second lens, and
T2: a distance along the optical axis from an image-side surface of the second lens to an object-side surface of the third lens.

8. The imaging lens according to claim 1, wherein the following conditional expression (8) is satisfied:

$$1.00 < r6/f < 12.00 \tag{8}$$

where r6: a paraxial curvature radius of an image-side surface of the third lens, and
f: a focal length of the overall optical system of the imaging lens.

9. The imaging lens according to claim 1, wherein the following conditional expression (9) is satisfied:

$$0.30 < r12/f < 3.50 \tag{9}$$

where r12: a paraxial curvature radius of an image-side surface of the sixth lens, and
f: a focal length of the overall optical system of the imaging lens.

* * * * *